(No Model.)
R. LANGHANS.
PROCESS OF PRODUCING COATINGS COMPOSED OF EARTHY OXIDS.
No. 571,531. Patented Nov. 17, 1896.
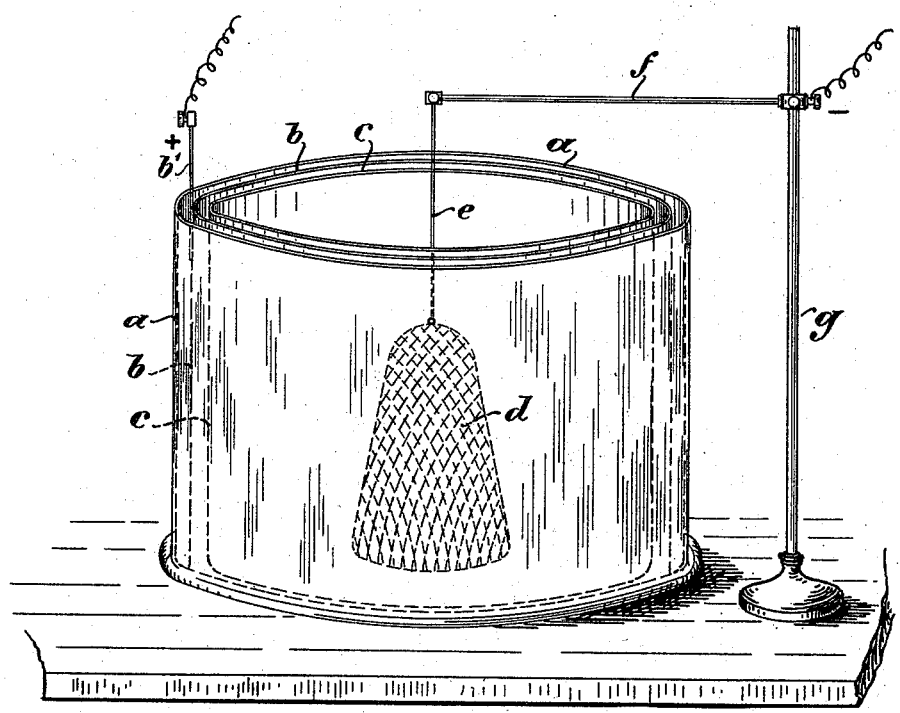
Witnesses:
A. C. Harmon.
Thomas J. Drummond.
Inventor
Rudolf Langhans.
by Crosby & Gregory.
attys.

UNITED STATES PATENT OFFICE.

RUDOLF LANGHANS, OF BERLIN, GERMANY.

PROCESS OF PRODUCING COATINGS COMPOSED OF EARTHY OXIDS.

SPECIFICATION forming part of Letters Patent No. 571,531, dated November 17, 1896.

Application filed November 18, 1895. Serial No. 569,346. (No specimens.)

*To all whom it may concern:*

Be it known that I, RUDOLF LANGHANS, a subject of the Emperor of Austria-Hungary, residing at Berlin, Kingdom of Prussia, German Empire, have invented a certain new and useful Process of Producing Coatings Composed of Earthy Oxids, of which the following is a full, clear, and exact description.

The present invention relates to the production, by the aid of electrolysis, of cohesive and perfectly adhesive coatings composed of one or more oxids of earth metals, this term including as equivalents the earth metals as well as the earth alkali metals.

Numerous unsuccessful attempts have been made during many years to produce for use in gas-lighting incandescent mantles having an indestructible foundation covered with a cohesive and perfectly adhesive coating of the oxids of earth metals. These attempts proved failures for the reason that the chemical process of forming them by precipitation and subsequent calcination was impracticable, because the precipitate could not be made sufficiently porous to give light emission, and to conform to a given configuration and give a uniform deposit on all points of a given body. On the other hand, the electrolytical method appeared hopeless, because the phenomena observed in the experiments made to electrolyze the few earth metals with a view of establishing methods of quantative analysis were not such as to exhibit the fitness of the electrolytical process for the solution of the problem.

The separation from the electrolyte either took place, as with the hydroxid of aluminium in the form of a loose cloudy aggregation of flocks floating about the negative electrode, or occurring, as in the case of the hydroxid of calcium, in the form of a powdery layer, constituting a non-coherent and non-adherent aggregation of extremely fine particles placed in such juxtaposition to each other that the deposition of a very fine film sufficed to perfectly insulate the electrode. Now I have succeeded in creating or forming by the aid of the electrolytical process and subsequent calcination coatings composed of one or more oxids of earth metals and earth alkali metals, which are perfectly cohesive and adhesive of themselves and which can be produced of any desired porosity and thickness and which are quite uniform too, however complicated the shape of the body to be coated may be.

If solutions exclusively containing salts of the earths or alkaline earths are subject to electrolysis with the aid of indifferent, *i. e.*, indissoluble, electrodes, (as, for instance, composed of metals of the platinum group, gold, carbon, &c.,) there will be no deposition. Neither hydrated oxids of the earth or earth alkali metals present in the solution nor other salts will separate out, whether the solution employed be concentrated or diluted. If to the said solution is added some alkali salt and this compound solution is subjected to the action of a current of weak density, then basic salts are separated out. If on the contrary a current of high density is caused to act, hydrated oxids are separated out and a deposit is obtained which closely surrounds the electrode, but it is of so very loose and voluminous a nature as to readily slip off from the electrode when the latter is removed from the electrolytical bath, so that the deposit is left behind in the latter.

I have discovered that the counteracting influences, of which the above defective results are the manifestations, can be overcome or excluded in a very efficacious manner by using as an electrolyte a solution of "basic" earth salt, which term will presently be explained.

Neutral earth salts, *i. e.*, earth salts of normal composition and structure, are of so weak a basic nature as to dissolve the hydrates of earth oxids of the same base as those with which they are prepared, as well as the hydrates of oxids of the other earth metals and of the earth alkali metals. The compounds obtained in this way, *i. e.*, by dissolving hydrated oxids of earth and earth alkali metals in solutions of said neutral salts, are what I term "basic" earth salts. Such neutral earth salts are, for instance:

$Th(SO_4)_2$: $Th(NO_3)_4$: $Zr(SO_4)_2$: $Zr(NO_3)_4$, $Al_2(SO_4)_3$: $Al_2(NO_3)_6$: $Y_2(SO_4)_3$: $Y_2(NO_3)_6$, $Ce(SO_4)_3$: $Ce(NO_3)_6$: $MgSO_4$, &c.

Solutions prepared with such basic earth salts on being subjected to electrolysis manifest a behavior which is essentially different from that of any other earth salt.

If in an aqueous but not quite concentrated solution of a neutral earth salt as much hydrate of an earth oxid is dissolved as the solution is capable of dissolving, eventually with the assistance of heat, (the said hydrated oxid having been produced by precipitation in the cold and carefully deprived of the last traces of alkali by washing with cold water,) and if the solution thus prepared is electrolyzed by means of a current of high density, (which will be pointed out in a following paragraph,) a deposit is brought about which intimately joins to the negative electrode, covering the same, however capricious its shape may be, with a very regular layer which is so perfectly cohesive and adhesive of itself that the electrode can be readily removed from the bath without losing the deposit, which latter, when dried, will form a dense and uniform coating of a horn-like appearance and of so strong a cohesive and adhesive power that it can be roughly manipulated without being caused to separate from the electrode forming the body or foundation.

In carrying out the process the body to be coated, a cone-shaped body intended for use as an incandescent mantle for gas-burners and constructed of wire-gauze or a fabric carbonized after having been fashioned into the desired form or shape and eventually covered with a metallic coating by electroplating, is placed in the bath prepared as described, after having been connected with the negative pole of a powerful source of electricity. Preferably the positive pole of the latter is connected with an indissoluble electrode of cylindrical shape, which has lodged in it a diaphragm-casing, in the center of which the said cone-shaped body is placed as the negative electrode. This diaphragm-casing contains the solution of the basic salt constituting the electrolytical bath, while the space between the outer side of the diaphragm-casing and the vessel contains hydrated oxid or carbonate of the same earth metal with which the basic earth salt constituting the bath is prepared, so that the acid split off from that basic salt by the action of the current is at once fixed at the positive electrode to thus regenerate the bath.

In the drawing I have shown in a somewhat diagrammatical manner the form of apparatus I prefer to use.

$a$ is the outer vessel, preferably of glass, $b$ the positive electrode, consisting of a thin sheet of platinum formed into a cylindrical vessel and provided with the positive terminal $b'$, and $c$ the diaphragm-casing, constructed of vegetable parchment.

$g$ is a stand having an adjustable arm $f$, at the inner end of which is hung, by means of a platinum wire $e$, the electro conductive foundation $d$, (shown in dotted lines,) consisting, for instance, of a cone-shaped hood constructed with thin platinum wire. The arm $f$, which is a good conductor of electricity and well insulated from the stand, forms the negative terminal of the apparatus.

On the development of hydrogen occurring at the negative electrode when the current is put on, the latter having become minimal, it is cut off, the electrode disconnected from the negative pole and removed from the bath and washed with water, and finally dried, first in an atmosphere of air as free from carbonic acid as possible and then by heat. By progressively increasing the latter up to calcining temperature the constitutional water is split off and driven out, so that the calcining leaves the coating in the form of pure oxid and without injuring its cohesive and adhesive qualities.

The solution of the basic salt above explained may also be prepared in the following way: To an aqueous solution of the neutral salt is added hydroxid of ammonium in such a proportion that the hydrated oxid which separates out is redissolved by the unaltered portion of the neutral salt remaining in solution, and this procedure is continued eventually with the assistance of heat as long as there is separation and redissolution. Instead of hydroxid of ammonium the well-known chemical equivalents of the same may be employed, as also the sodium and potassium hydroxids. This mode of preparing the bath has the advantage of causing the hydrated oxid to be deposited by electrolysis on the negative electrode in a somewhat less dense condition, so that the current can pass more freely, whereby the coating is allowed to form with such thickness as will be consistent with the special shape of the body, and this result is obtained without injuring the cohesive and adhesive powers of the coating or its uniformity.

Instead of employing an aqueous solution of the basic earth salt or salts I may also make use of solutions prepared with an alcohol, (aethyl, methyl, propyl, butyl, amyl, &c.,) as, for instance, by dissolving nitrate of thorium in an alcohol, and when working with such alcoholic solution I prefer to cause the separation and subsequent redissolution of hydrated oxid by means of an alcoholic solution of ammonia.

The use of one or the other of the described modes of preparing the electrolytical bath depends to some extent upon the required thickness of the coating. If the latter is to be put on thin, I prefer to use the first mode, while for thicker coatings the ammonia process is more advantageous.

It is obvious that the same result will be obtained whether the bath is prepared with but one neutral earth or earth alkali salt or with several of them, or with neutral earth and earth alkali salts in combination, and whether in the first method the hydroxid added to the solution of the neutral salt is of the same or of a different base.

As far as it is allowed by the dissolubility of the respective salts the ordinary earths are preferably made use of in the form of sulfates with the addition of a small proportion of nitrates. For instance, for depositing hydrated oxid of aluminium in combination with hydrated oxids of other earth or earth alkali metals, as, for instance, calcium and magnesium hydroxids, I employ a solution of sulfate of aluminium, to which are added calcium and magnesium nitrates. In the case of the so-called "rare earths" I prefer to use the nitrates of the same or more advantageously their ethylic sulfates and analogous compounds.

As to the current density to be applied the following statements will suffice: $N.D._{100}$, meaning normal density of current for one hundred square centimeters.

In the case of solutions containing twenty per cent. of zirconium or thorium salt the minimum of current density is $N.D._{100}=166$ amperes, corresponding to 1.66 amperes per square centimeter; in the case of solutions containing twenty per cent. of the so-called "yttria earth," $N.D._{100}=125$ amperes, corresponding to 1.25 amperes per square centimeter; with solutions containing twenty per cent. of alumina or magnesia salts $N.D._{100}=75$ amperes, corresponding to 0.75 ampere per square centimeter. In general I prefer to employ twice as great a current density in every case.

In the act of drying, and especially in the calcining step, it may happen that the coating contracts or shrinks irregularly and thereby is caused to crack or craze. Moreover, it may become so dense as to be unfit for certain applications, for instance, for use as an incandescent body for gas and other burners. This may be wholly prevented without injuring the coherence or the adhesion of the coating, as follows: One means consists in arranging on the foundation, previously to producing the deposit, a reticular cover formed, as by spinning, with fine combustible fibers, such as cotton, silk, and the like and presenting large interstices, whereby the deposit is prevented on such points of the foundation where those fibers are in contact with it, so that the coating becomes porous by the subsequent destruction of said fibers in the calcining step. By virtue of this porous condition the shrinking of the coating is enabled to take place in a very uniform manner. The other means consists in rendering the mass of coating porous by converting the hydroxids previously to calcining into indissoluble organic or inorganic salts capable of being reduced into oxids by the action of heat. Such salts are, for instance, the tartrates, the oxalates, the formates, the tannates, and the carbonates on the one hand and the slenites on the other hand. I prefer to form the latter, inasmuch as their calcination leaves behind the oxids in a more perfectly porous or spongy condition than is obtainable by the aid of any of the other salts mentioned. This conversion of the hydrated oxids into the said salts is effected chemically in the following manner: The body coated with the hydrated oxid or oxids is dipped into an aqueous solution of the said acids or of appropriate salts of the same, preferably of their ammonia salts. The carbonic acid may be applied in the gaseous form.

In the case of selenious acid I prefer to use it in the form of a moderately-concentrated solution.

A modified method of preparing the electrolytical bath, which method has the advantage of avoiding the hereinbefore-described transformation of the hydroxid deposit into such salts as specified previous to calcination, is as follows:

In the solution of the basic earth salt or salts to be electrolyzed is dissolved an organic base (alkaloid) in the form of one of the salts into which it combines with an acid, as, for instance, with sulfuric acid or a mixture of such alkaloid salts. Such organic bases are, for instances, opium, morphine, chinine, cinchonine, bases of the veratrine class, strychnine, brucine, picrine, bases of the pyridine class, &c. These salts are split up by the action of the electric current, the organic base being thereby caused to deposit upon the negative electrode. Now if the compound solution containing one or more alkaloid salts besides the basic earth salt or salts, for instance, a mixed solution of the sulfates of thorium and cinchonine, is subjected to electrolysis, thorium hydroxid, and cinchonine are simultaneously deposited on the negative electrode in the form of an intimate mixture, so that the calcination of this deposit in destroying the cinchonine or other organic base leaves the earth oxid in a perfectly porous condition. The coatings thus produced are as adhesive and cohesive of themselves as those brought about with the aid of the other methods described. Moreover, the addition of alkaloid salts enables solutions of "neutral" earth salts to be employed with advantage for the electrolytical production of earth-oxid coatings that are likewise uniform and dense as well as cohesive and adhesive of themselves; but I prefer to use the described compound solutions prepared with basic earth salts for the reason that in this case the yellowish or brownish coloration of the bath, resulting from decomposition of the alkaloid salt occurring to some extent at the positive pole, is by far slighter than when neutral earth salts are employed.

Having fully described my invention, what I claim, and desire to secure by Letters Patent, is—

1. The herein-described process of preparing basic earth salts, which consists in dissolving hydrated oxids of earth metals in solutions of neutral earth salts, to thereby form an electrolyte, and separating the hydroxids of the earth metals by the action of an electric current of high density, substantially as described.

2. The herein-described process of producing coherent and firmly adhesive porous coatings composed of oxids of the earth metals, which consists in electrolyzing a solution of basic earth salts by an electric current of high density, depositing thereby upon an electroconductive foundation as an electrode hydroxids of earth metals, and drying and calcining the deposit.

3. The herein-described process of producing an incandescing body composed of an electroconductive foundation coated with oxids of the earth metals, which consists in electrolyzing a solution of basic earth salts by an electric current of high density to thereby deposit hydroxids from the said solution upon the said foundation immersed therein as a cathode, dipping the so-coated foundation into an aqueous solution of an acid or its specified equivalent capable of converting the deposited hydroxids into salts which are indissoluble in the solution, and which will be reduced to oxids by the action of heat, and then drying and calcining the thus converted deposit to drive off the acid.

4. The herein-described process of producing coherent and firmly adhesive porous coatings composed of oxids of the earth metals upon electroconductive foundations, which consists in electrolyzing with an electric current of high density a solution containing basic earth salts and an alkaloid salt, thereby depositing in an intimate union hydroxids of earth metals and the alkaloid upon the foundation placed in the said solution as a cathode, and drying and calcining the coated foundation to destroy the organic substance to convert the hydroxids into oxids.

In testimony whereof I have hereunto set my hand in the presence of two subscribing witnesses.

RUDOLF LANGHANS.

Witnesses:
W. HAUPT,
M. BAUR.